United States Patent [19]

Yamada et al.

[11] Patent Number: 5,390,641
[45] Date of Patent: Feb. 21, 1995

[54] FUEL INJECTION SYSTEM FOR INTERNAL COMBUSTION ENGINE

[75] Inventors: Masakazu Yamada, Nagoya; Masakazu Ninomiya, Kariya; Yasuo Sagisaka, Komaki, all of Japan

[73] Assignee: Nippondenso Co., Ltd., Kariya, Japan

[21] Appl. No.: 162,913

[22] Filed: Dec. 8, 1993

[30] Foreign Application Priority Data

Dec. 9, 1992 [JP] Japan ................. 4-329255

[51] Int. Cl.⁶ ............................................. F02M 51/00
[52] U.S. Cl. ...................................... 123/491; 123/490; 123/480
[58] Field of Search ................... 123/491, 490, 480; 364/431.1, 431.04, 431.03

[56] References Cited

U.S. PATENT DOCUMENTS

| | | | |
|---|---|---|---|
| 4,418,674 | 12/1983 | Hasegawa et al. | 123/491 |
| 4,459,961 | 7/1984 | Nishimura et al. | 123/491 |
| 4,508,083 | 4/1985 | Hasegawa et al. | 123/491 |
| 5,022,374 | 6/1991 | Denz et al. | 123/491 |
| 5,033,439 | 7/1991 | Eygret | 123/491 |
| 5,074,271 | 12/1991 | Suzuki et al. | 123/491 |
| 5,099,813 | 3/1992 | Kurosu et al. | 123/491 |
| 5,107,431 | 4/1992 | Ohta et al. | 123/491 |

FOREIGN PATENT DOCUMENTS

| | | | |
|---|---|---|---|
| 60-111042 | 6/1985 | Japan | 123/491 |
| 60-240875 | 11/1985 | Japan | 123/491 |
| 3-54337 | 3/1991 | Japan | 123/491 |

*Primary Examiner*—Raymond A. Nelli
*Attorney, Agent, or Firm*—Cushman, Darby & Cushman

[57] ABSTRACT

A fuel injection control system for an internal combustion engine which can eliminate lean misfiring and rich misfiring at asynchronous injection and exhausting of non-combustioned HC. When the asynchronous injection is performed at engine cranking or at acceleration, a judgement is made as to whether the injected fuel will be divided by closure of an intake valve. When division is not detected, fuel injection is performed in normal manner. When division is detected, rate of the fuel division is computed. As a result of computation, fuel injection is performed when judgement is made that a predetermined amount of the injected fuel will be introduced into the cylinder. Furthermore, the amount of fuel not introduced into the cylinder is computed to reduce a corresponding amount from a fuel injection amount for the next cycle. On the other hand, when judgement is made that the predetermined amount of fuel will not be introduced into the cylinder, fuel injection does not take place.

13 Claims, 16 Drawing Sheets

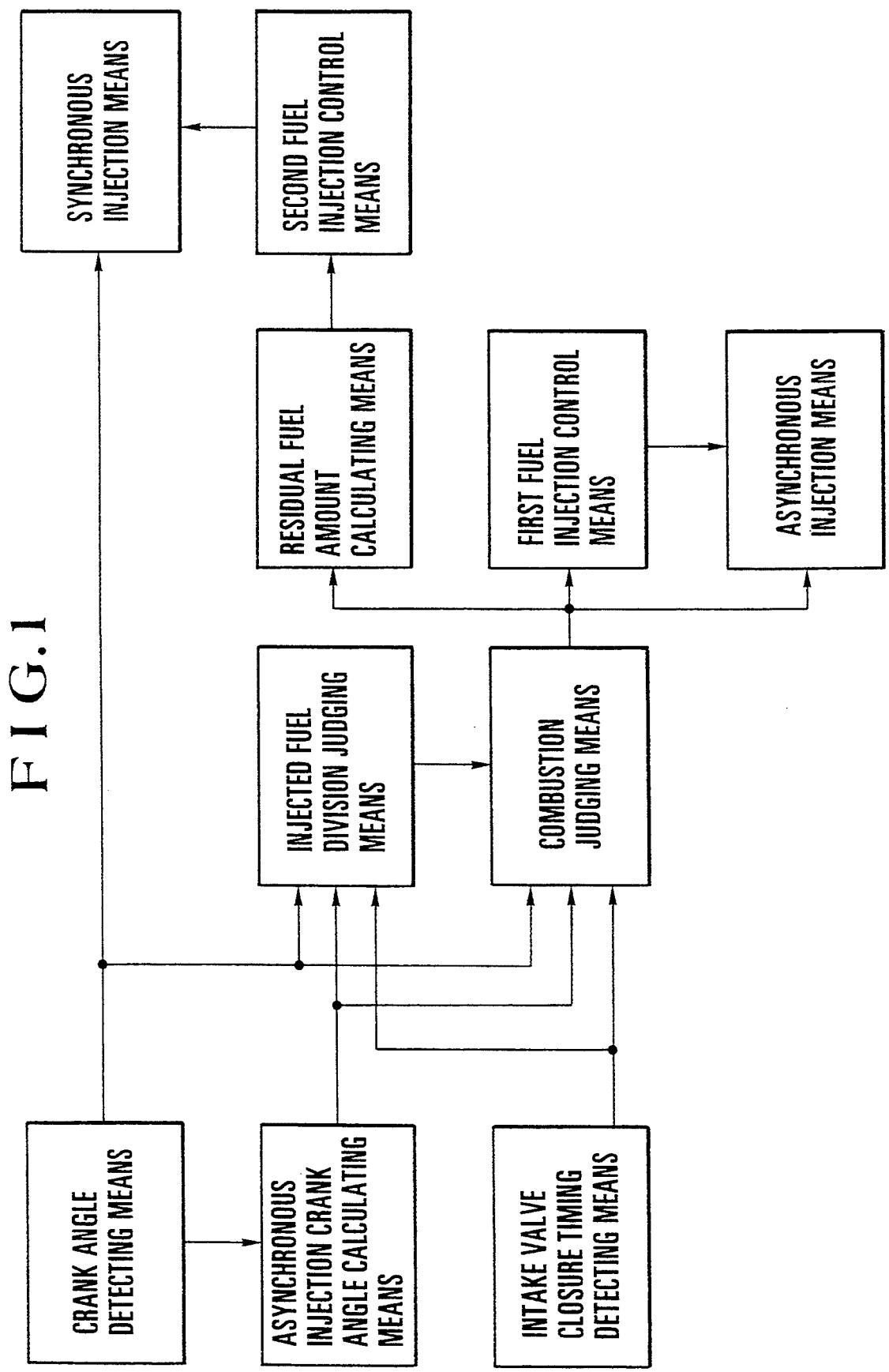
F I G. 1

FUEL INJECTION SYSTEM FOR INTERNAL COMBUSTION ENGINE

BACKGROUND OF THE INVENTION

The present invention relates to a fuel injection control system for an internal combustion engine.

Conventionally, there has been proposed a system for controlling fuel injection and spark ignition from the first revolution of the internal combustion engine by detecting a crank angle position before starting up the engine (on state of a key switch) (Japanese Unexamined Patent Publication No. 60-240875).

Employing the above-mentioned system, it becomes possible to perform independent synchronous injection from starting-up of the internal combustion engine. A timing chart excluding fuel injection portions (first injection signals for #1 and #3 cylinders) under asynchronous injection in FIG. 2 corresponds the operational timing of the above-mentioned system. It should be noted that n-th cylinder will be expressed as #n cylinder throughout this specification. Fuel injection in this system is normally initiated at a fuel injection initiation timing at approximately 90° CA (crank angle) before opening of an intake valve. Accordingly, the cylinder, for which an injection pulse is first transmitted, is #4 cylinder in FIG. 2. Namely, despite the fact that the intake valve of #3 cylinder is open, fuel injection does not take place for the #3 cylinder. This causes a delay in the extend of 180° CA to first combustion in case of a 4-cylinder internal combustion engine. As a solution for this, a system performing asynchronous injection for #1 and #3 cylinders has been proposed (Japanese Unexamined Patent Publication No. 60-111042). This may eliminate a delay to the first combustion and permits the internal combustion engine to start-up more quickly.

In the above-mentioned system, asynchronous injection of fuel takes place irrespective of crank angle positions of respective cylinders. Therefore, as in the #1 cylinder of FIG. 2, injected fuel can be divided to the next cycle (720° CA later). Then, division of the injected fuel is caused, misfiring due to lean mixture for lack of fuel can be caused to exhaust non-combustioned HC.

SUMMARY OF THE INVENTION

Therefore, it is an object of the present invention to prevent lean misfiring and exhausting of non-combustioned HC.

According to one aspect of the invention, as shown in FIG. 1, there is provided a fuel injection control system for an internal combustion engine comprises crank angle detecting means for detecting a crank angle, synchronous injection means for performing synchronous injection of a fuel into an intake manifold for each cylinder in synchronism with the crank angle detecting the crank angle detecting means, intake valve closure timing detecting means for detecting a crank angle corresponding to closure of an intake valve of each cylinder of the engine, in advance, asynchronous injection means for performing asynchronous injection to the intake manifold of each cylinder upon at least one of engine starting-up and acceleration state, asynchronous injection crank angle calculating means for calculating crank angles at initiation of an asynchronous injection and termination of the asynchronous injection before initiation of the asynchronous injection by the asynchronous injection means, injected fuel division judging means for judging whether the asynchronous injection performed by the asynchronous injection means is divided or not on the basis of the crank angle position detected by the intake valve closure timing detecting means in advance and the crank angles calculated by the asynchronous injection crank angle calculating means, and first fuel injection control means for inhibiting fuel injection when judgement that division of the injected fuel is judged by the injected fuel division judging means.

With the construction set forth above, upon the asynchronous injection of the fuel by the asynchronous injection means upon at least one of engine cranking state and engine accelerating state, judgement can be made whether the injected fuel will be divided by closure of the intake valve by the injected fuel division judging means. At this time, the injected fuel division judging means makes judgement whether the injected fuel will be divided or not on the basis of the crank angle at initiation of the asynchronous injection and the crank angle at termination of the asynchronous injection derived by the asynchronous injection crank angle calculating means based on the crank angle detected by the crank angle detecting means, and the crank angle position at closure of the intake valve of each cylinder detected by the intake valve closure timing detecting means. When division is not judged, the asynchronous injection takes place by the asynchronous injection means in normal manner. When division is judged, fuel injection is prevented by the first fuel injection control means. Also, the synchronous injection of the fuel in synchronism with the crank angle is performed by the synchronous injection means.

Furthermore, when the injected fuel division judging means makes judgement that the injected fuel will be divided. combustion judging means makes judgement whether combustion is possible with the divided fraction of the injected fuel. If judgement is made that combustion is possible, inhibiting of fuel injection by the first fuel injection control means may be made null.

Also, it is possible to calculate the amount of fuel not introduced into the cylinder by residual fuel amount calculating means and to reduce the fuel injection amount in next synchronous injection at the corresponding amount by second fuel injection control means.

According to the present invention, lean misfiring and rich misfiring which can be caused by the asynchronous injection to take place upon at least one of the engine cranking state or the engine accelerating state can be successfully prevented. Also, by this, exhausting of non-combustioned HC can be avoided. Furthermore, by prevention of rich misfiring, improvement in engine starting-up characteristics, acceleration characteristics and anti-bronzing characteristics can be achieved.

BRIEF DESCRIPTION OF THE DRAWINGS

FIG. 1 is a schematic block diagram showing the fundamental construction of a fuel injection control system according to the present invention;

DESCRIPTION OF THE PREFERRED EMBODIMENT

Figure 2:
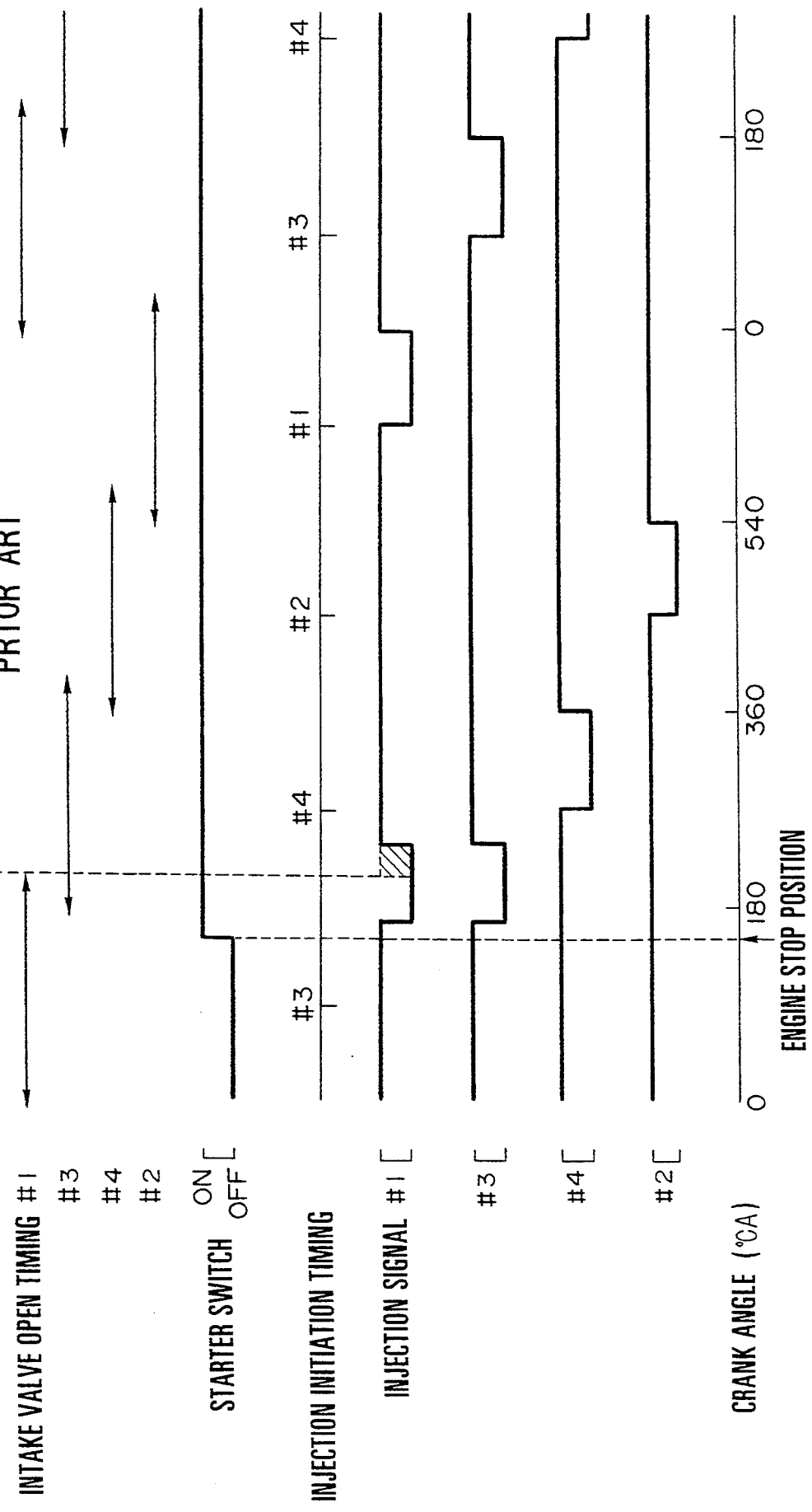
FIG. 2 is a timing chart of the prior art in connection with fuel injection at starting-up of an internal combustion engine.
Figure 3:
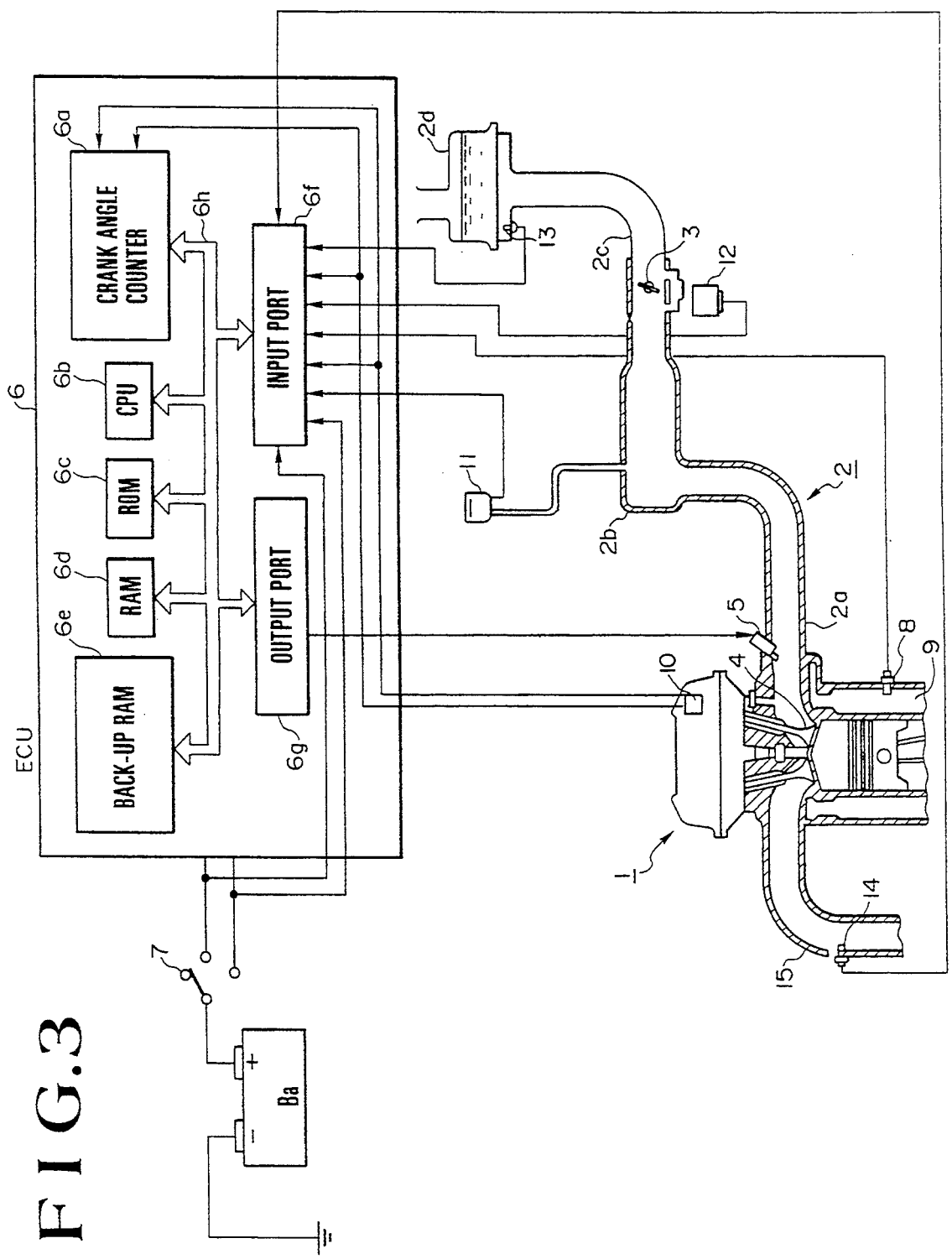
FIG. 3 is a diagrammatic illustration showing a construction of the preferred embodiment of a fuel injection control system of the present invention.

A system construction of one embodiment of the present invention is illustrated in FIG. 3.

In the shown embodiment, the present invention is applied to a 4 cycle, 4-cylinder internal combustion engine.

For each cylinder of the internal combustion engine (hereinafter simply referred to as engine) 1, an intake manifold 2a, a surge tank 2b, an induction pipe 2c and an air cleaner 2d forming an air induction system are connected. A throttle valve 3 is arranged in the induction pipe 2c. Each cylinder of the engine 1 and the intake manifold 2a are communicated and blocked in synchronism with engine revolution by an intake valve 4.

Each injector 5 arranged in the intake manifold 2a for supplying fuel for each cylinder of the engine 1 can be controlled independently of the other so that independent synchronous fuel injection can be performed. A fuel amount to be injected through each injector 5 is controlled by an electronic control unit (ECU) 6. The ECU 6 comprises an input port 6f including an A/D converter and receiving various signals, an output port 6g for outputting various signals, a ROM 6c preliminarily storing information (such as, the intake valve closing timing of each cylinder, various maps and so forth), a RAM for reading and writing information as required, a back-up RAM 6e for maintaining read and written information even when a power supply from a key switch 7 is cut off, a CPU 6b for performing various arithmetic operations, a crank position signal counter 6a for counting a crank position signal input from a crank angle sensor 10 per every 1° CA of angular displacement of a crankshaft, a common bus 6h for connecting these components. The ECU 6 receives power supply from a battery Ba via a key switch 7 which is common to a starter switch. The ECU 6 is designed to derive a fuel injection amount depending upon a demand on the basis of an engine coolant temperature THW, an engine speed $N_e$, a battery voltage BA, an induction pipe pressure PM, a throttle valve open angle TA, an intake air temperature THA and so forth so that fuel injection takes place for a period corresponding to the derived fuel amount.

Each parameter to be employed for determining the fuel injection amount is detected by each sensor and fed to the ECU 6 as a signal. An engine coolant temperature sensor 8 for detecting the engine coolant temperature is mounted on a water jacket defined surrounding each cylinder to circulate an engine coolant therethrough. An engine speed is derived from crank angle detected by the crank angle sensor 10 provided on a camshaft. The battery voltage BA is directly read from the battery Ba. An induction passage pressure sensor 11 for detecting the induction passage pressure PM is mounted on the surge tank 2b. The throttle valve open angle THW is detected by a throttle angle sensor 12. An intake air temperature sensor 13 detecting the intake air temperature THA is mounted on the air cleaner 2d. On the other hand, $O_2$ sensor for detecting an oxygen concentration in an exhaust gas after combustion of the injected fuel is mounted on an exhaust pipe 15.

Figure 4:
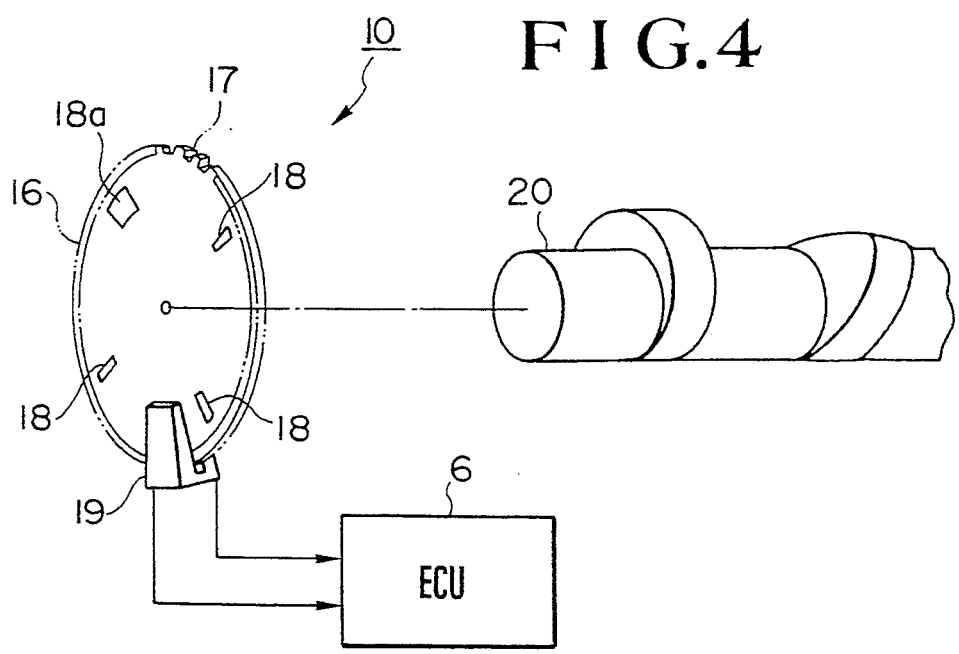
FIG. 4 is an illustration showing a construction of a crank angle sensor employed in the preferred embodiment of the invention.

In the shown embodiment, as the crank angle sensor 10 for feeding crank angle signal to the ECU 6, one disclosed in Japanese Unexamined Patent Publication No. 60-240875 will be employed. Namely, as shown in FIG. 4, a rotor 16 provided on a camshaft 20 has 720 teeth arranged in regular interval on the outer circumference and 4 slits 18 for cylinder discrimination in the radially inside of the outer circumference. One of the slits 18a is provided greater circumferential width than others, the angular position of which is referred to as a reference angle. A signal generated with respect to the slit 18a at the reference angle is taken as a reference angle signal. An optoelectric pick-up 19 is provided at a portion across which the outer circumference of the rotor 16 passes while the rotor 16 rotates, with covering the teeth and the slits so that the crank position signal per every 1° CA of the crankshaft angular displacement and a cylinder discrimination signal are output. The ECU 6 incorporates the crank angle counter 6a for counting-up the crank angle signal, as set forth above. The crank angle counter 6a initiates counting of the crank position signal at a crank angle of 0° CA (top-dead-center:TDC of a suction stroke of the #1 cylinder. The counter value of the crank angle counter 6a is reset at every 720° CA. Accordingly, the counter value of the crank angle counter 6a becomes the crank angle. Upon stopping the engine, the instantaneous crank angle is stored in the back-up RAM 6e of the ECU 6. The method of detection of the crank angle upon stopping of the engine is as illustrated in a flowchart of FIG. 5.

Figure 5:
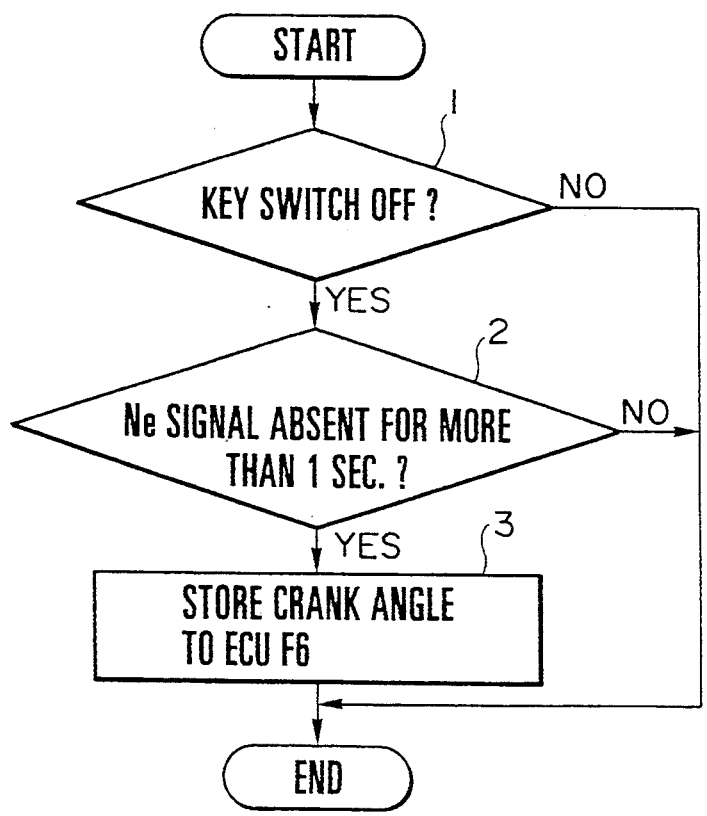
FIG. 5 is a flowchart showing a process for storing a crank angle in ECU upon stopping of the internal combustion engine in the preferred embodiment of the invention.

Namely, in FIG. 5, it is judged that the engine 1 is stopped when the crank angle signal is not present for a period longer than or equal to 1 second (step 2) after turning off the key switch (step 1). The instantaneous counter value of the crank angle counter 6a is written in the back-up RAM 6e of the ECU 6 as the crank angle (step 3). It should be noted that the shown process is performed in a main routine.

Figure 6:
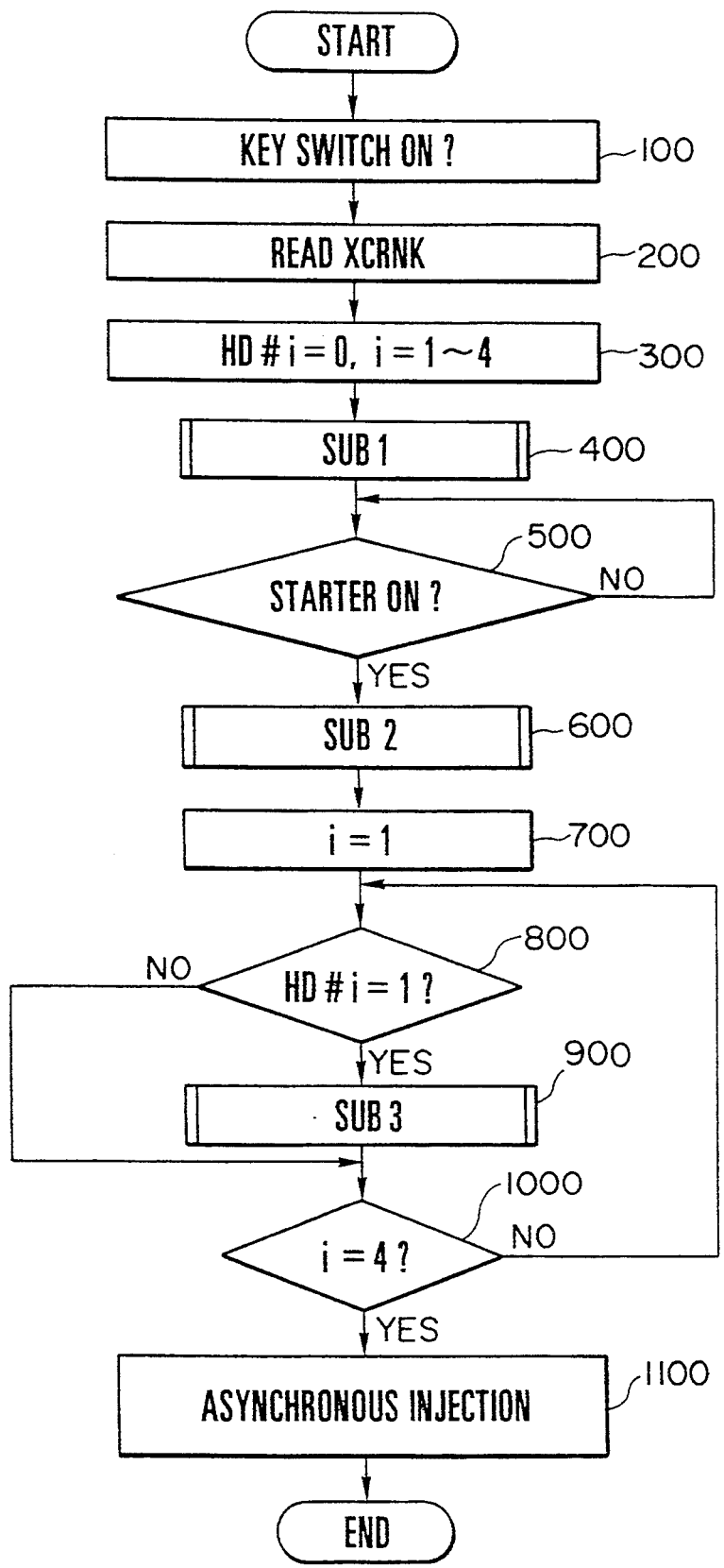
FIG. 6 is a flowchart showing a process to be executed by ECU in an example where the present invention is applied for a synchronous injection upon starting-up of the internal combustion engine.

Next, discussion will be given for an example, in which the present invention is applied for asynchronous fuel injection upon cranking of the engine 1, in the system constructed as illustrated in FIG. 3, along a flowchart of FIG. 6. It should be appreciated that the shown process is performed in response to turning on of the key switch.

At first, when turning on of the key switch is detected at a step 100, the shown routine is initiated. At a step 200, the crank angle (XCRNK) upon last occurrence of termination of the engine operation is read out from the back-up RAM 6e of the ECU 6. At a step 300, asynchronous injection identification flag HD#i of each cylinder is set to 0. Here, the asynchronous injection identification flag HD#i is a flag so as not to perform asynchronous injection for the cylinder where HD#i=0 and to perform asynchronous injection for the cylinder where HD#i=1.

Then, at a step 400, the process enters into a sub-routine 1. In the process of the sub-routine 1, an angular range of XCRNK is terminated. Then, on the basis of the angular range of XCRNK, a cylinder to perform asynchronous injection is identified. For the identified cylinder, the asynchronous injection identification flag HD#i is set to "1". The detailed process of the sub-routine 1 will be discussed later.

Next, at a step 500, turning on of the starter switch is confirmed. Then, at a step 600, the process enters into a sub-routine 2. Here, reading and arithmetic processing of various data is performed. Detailed process in the sub-routine 2 will be discussed later.

Next, at a step 700, a cylinder number is set i=1, and then process is advanced to a step 800. At the step 800, the asynchronous injection identification flag HD#i of #i cylinder is checked if HD#i=1 or not. If HD#i=1, the process is advanced to a step 900, and if HD#i=0, the process is advanced to a step 1000.

At the step 900, process relating to the asynchronous injection is performed. The process performed at the step 900 will be discussed later. Then, at the step 1000, check is performed whether i=4 or not. At this step, check is performed whether the process subsequent to the step 800 is performed with respect to all cylinders. Since the shown embodiment is directed to 4-cylinder engine, if i=4, judgement can be made than all cylinders are processed. Then, the process is advanced to a step 1100. At the step 1100, the asynchronous injection takes place for the cylinder having the asynchronous injection identification flag HD#i=1. Then, the shown routine goes END.

Figure 7:
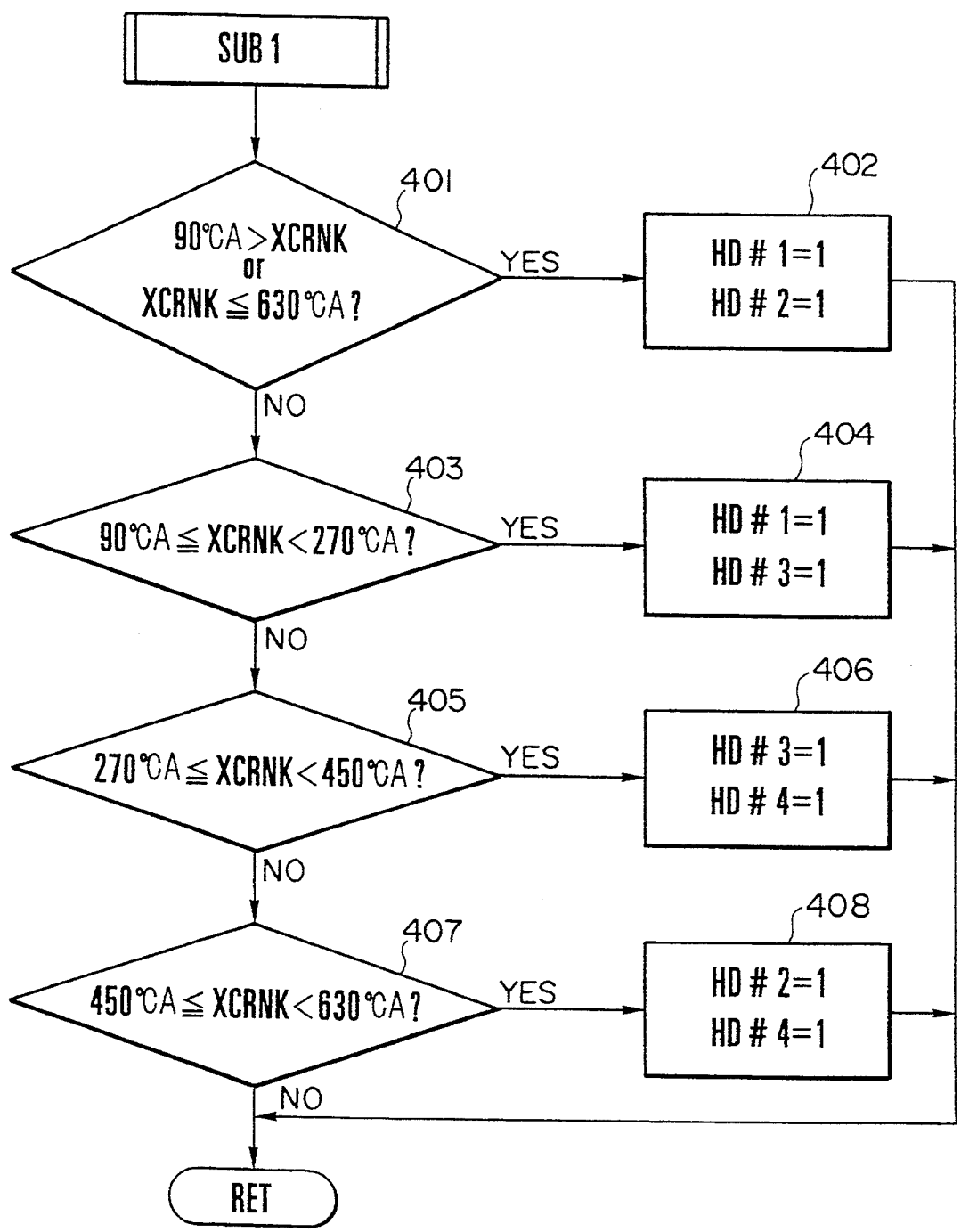
FIG. 7 is a flowchart showing a process to be executed by ECU in an example where the present invention is applied for a synchronous injection upon starting-up of the internal combustion engine.

The process of the sub-routine 1 to be performed at the step 400 will be discussed with reference to a flowchart of FIG. 7.

At first, at a step 401, when XCRNK falls within a range of 0° CA≦XCRNK<90° CA or 630° CA≦XCRNK<720° CA, the asynchronous injection identification flags HD#1 and HD#2 are set to "1" at a step 402. Similarly, at a step 403, when XCRNK falls within a range of 90° CA≦XCRNK<270° CA, the asynchronous injection identification flags HD#1 and HD#3 are set to "1" at a step 404. At a step 405, when XCRNK falls within a range of 270° CA≦XCRNK<450° CA, the asynchronous injection identification flags HD#3 and HD#4 are set to "1" at a step 406. At a step 407, when XCRNK falls within a range of 450° CA≦XCRNK<630° CA, the asynchronous injection identification flags HD#2 and HD#4 are set to "1" at a step 408. After completion of the foregoing process, the shown process goes end to return the main process. As can be appreciated, through the foregoing process, the cylinders to perform asynchronous injection are determined on the basis of the crank angle upon the last occurrence of termination of the engine operation.

Figure 8:
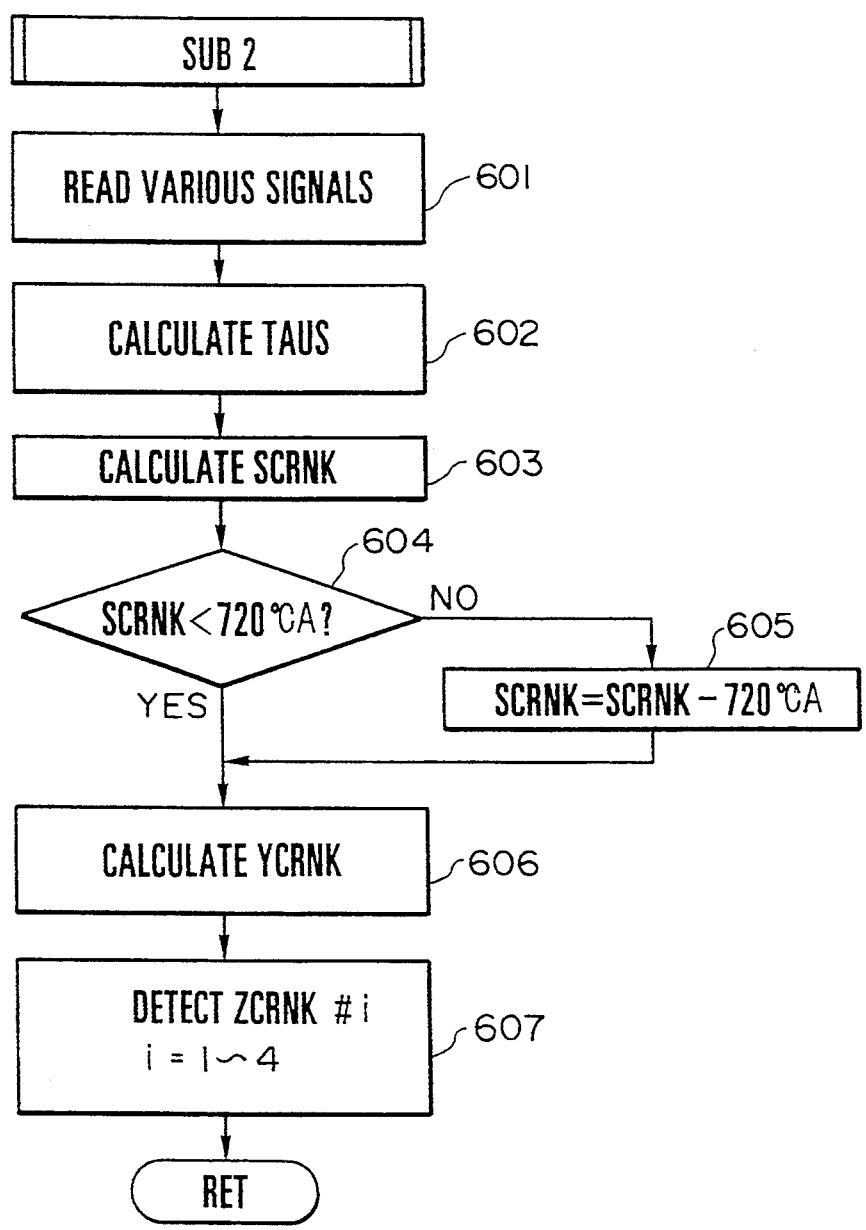
FIG. 8 is a flowchart showing a process to be executed by ECU in an example where the present invention is applied for a synchronous injection upon starting-up of the internal combustion engine.

Next, discussion will be given for the subroutine 2 of the foregoing step 600 with reference to a flowchart of FIG. 8.

At first, at a step 601, the battery voltage BA, the engine speed $N_e$, the induction pipe pressure PM and the engine coolant temperature THW necessary for determining a fuel injection amount for asynchronous injection upon cranking of the engine, are read out. At a step 602, asynchronous injection period (TAUS) is derived through a process shown in a flowchart of FIG. 12 on the basis of the read signals. Then, at a step 603, an asynchronous injection initiation timing (SCRNK) is calculated. In the shown embodiment, SCRNK is derived by adding a possible crankshaft angular displacement within 50 ms after cranking of the engine. The possible crank angular displacement during the 50 ms period can be calculated through $XCRNK + 3N_e/10$, assuming the engine speed is $N_e$. Then, at a step 604, check is performed whether SCRNK is smaller than 720° CA. If SCRNK is greater than 720° CA, 720° CA is subtracted from SCRNK at a step 605, and then process is advanced to a step 606. On the other hand, if SCRNK is smaller than 720° CA, the process is directly advanced to the step 606. At the step 606, an crank angle (YCRNK) at a fuel injection termination timing in the asynchronous injection is calculated on the basis of SCRNK derived at the step 603 and the engine speed $N_e$. In practice, YCRNK is calculated by $SCRNK + 6N_e \times TAUS/1000$. At a step 607, a crank angular position (ZCRNK#i) for closing the intake valve of each cylinder, which is preliminarily stored in the ROM 6c of the ECU 6, is read out. The value of ZCRNK#i is determined according to the engine characteristics. Illustratively, in the shown embodiment, ZCRNK#1=210° CA, ZCRNK#3=390° CA, ZCRNK#4=570° CA and ZCRNK#2=750° CA. Then, process goes END to return the process to the routine of FIG. 6.

Figure 9:
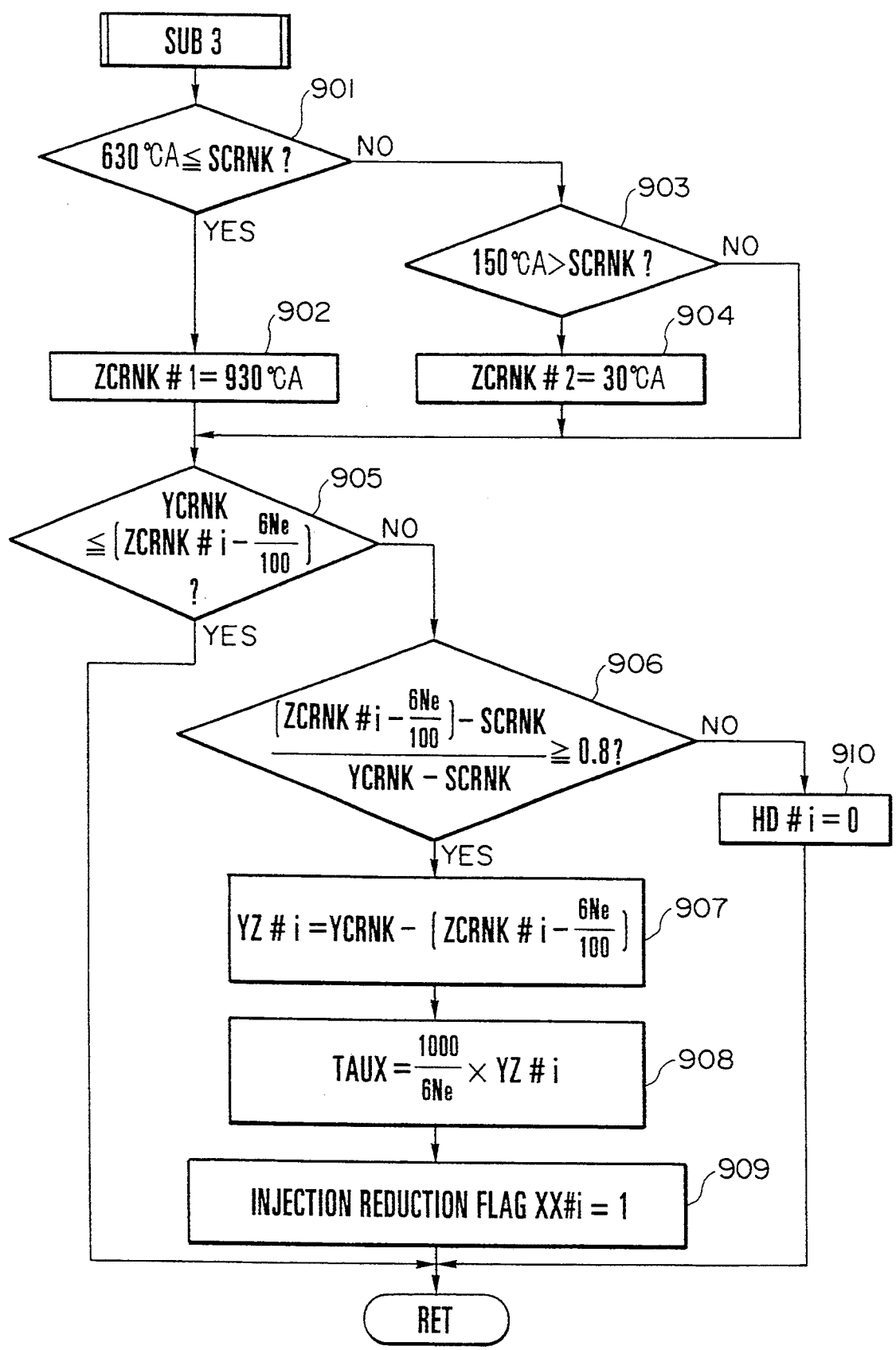
FIG. 9 is a flowchart showing a process to be executed by ECU in an example where the present invention is applied for a synchronous injection upon starting-up of the internal combustion engine.

Next, discussion will be given for a process of asynchronous injection in the sub-routine 3 to be executed at the step 900 with reference to FIG. 9.

At first, through steps 901–904, a process for eliminating a problem arisen by varying the value of SCRNK of the #2 cylinder across 0° CA, is performed.

When SCRNK is greater than or equal to 630° CA as checked at a step 901, ZCRNK#i is reset to 930° CA at a step 902. On the other hand, at the step 901, when SCRNK is less than 630° CA, the process is advanced to a step 903 to check whether SCRNK is less than 150° CA. When SCRNK is less than 150° CA, the process is advanced to a step 904 to set ZCRNK#2 to 30° CA. Then, process is advanced to a step 905. On the other hand, when SCRNK is not less than 150° CA, the process is directly advanced to the step 905.

Figure 10:
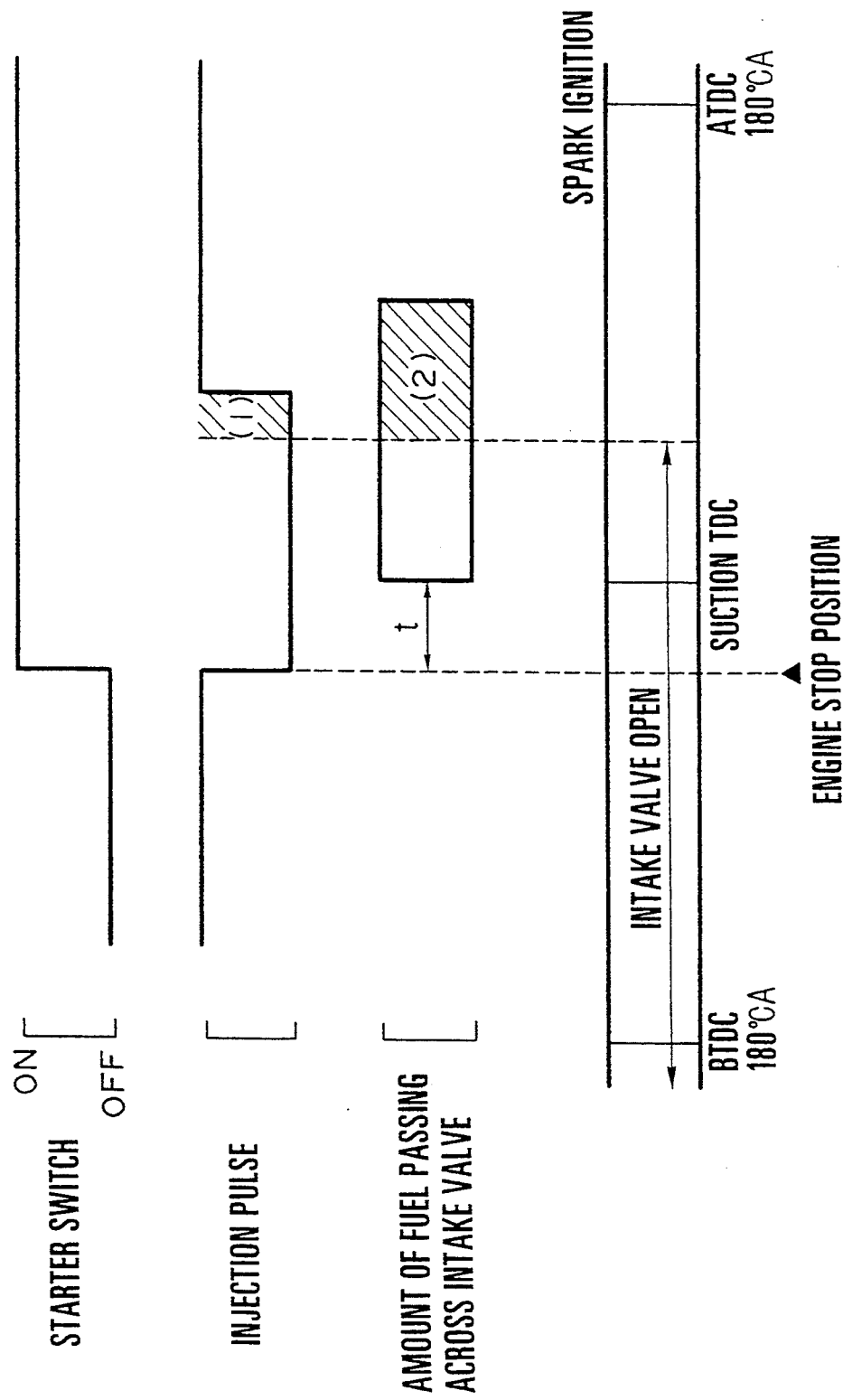
FIG. 10 is a timing chart showing a period taken to reach an intake valve of a fuel injected from an injector.

At the step 905, check is performed is YCRNK$\leq$(ZCRNK#i$-$6N$_e$/100). The reason of subtracting 6N$_e$/100 from ZCRNK#i is presence of difference between a rate of the injected fuel to be divided by closure of the intake value 4 as calculated from the injection pulse and from the fuel amount actually passing through the intake valve 4, as can be clear from FIG. 10, and thus for correcting this difference. This time difference is caused due to lag in actuation of the injector 5 or a period t taken to reach the intake valve 4 of the fuel injected from the injector 5. This period t is a specific value per individual internal combustion engine. Illustratively, the shown embodiment makes correction assuming that the period t is 10 ms. In this step, check is made whether the intake valve 4 is closed before completion of fuel injection to cause division of the injected fuel or not. Here, when the intake valve closure timing is earlier than the fuel injection terminating timing with taking the fuel transfer period, the fuel is considered to be divided. Here, when judgement is made that the fuel is not divided, namely when YCRNK$\leq$(ZCRNK#i$-$6N$_e$/100) is satisfied, the shown routine goes END to return the process to the step 1000.

Next, when judgement is made that the fuel is divided at the step 905, the process is advanced to a step 906. Here, judgement is made whether the following equation is satisfied or not.

$$\frac{(ZCRNK\#i - 6N_e/100) - SCRNK}{YCRNK - SCRNK} \geq 0.8$$

In this equation, the denominator expresses the injection period of fuel injection and the numerator expresses a period from initiation of fuel injection to closure of the intake valve 4. Namely, when a predetermined amount of the injected fuel is introduced into the cylinder, judgement is made that combustion can take place. Illustratively, the shown embodiment sets the predetermined amount at 80% of the injected fuel. The reason is that when 80% of fuel injection amount targeted to achieve air/fuel ratio A/F=14.7 is introduced into the cylinder, the air/fuel ratio will be A/F$\approx$1.8 which value is experimentarily found to be a stably combustible range. When the foregoing equation is satisfied and thus judgement that combustion can take place is made, the process is advanced to a step 907. On the other hand, when the foregoing equation cannot be satisfied and thus judgement is made that misfiring is possibly caused, the process is advanced to a step 910. At the step 907, calculation for YCRNK$-$(ZCRNK#i$-$6-N$_e$/100) is performed to set the result as YZ#i.

This is for calculating a injected fuel amount which is divided by closure of the intake valve 4 and not introduced into the cylinder on the basis of YZ#i. After completion of calculation, the process is advanced to a step 908. At the step 908, a fuel amount TAUX to be reduced in the next cycle for the corresponding cylinder is calculated. Then, at a step 909, a fuel injection amount reduction flag XX#i for commanding reduction of the fuel injection amount in the next cycle of #i cylinder in a corresponding amount to the residual fuel amount, is set to "1". Thereafter, the process of the shown routine goes END and advanced to the step 1000. On the other hand, when the foregoing equation is not satisfied as checked at the step 906, the asynchronous injection identification flag HD#i is reset to "0", and then process of the routine goes end and return to the step 1000.

Figure 11:
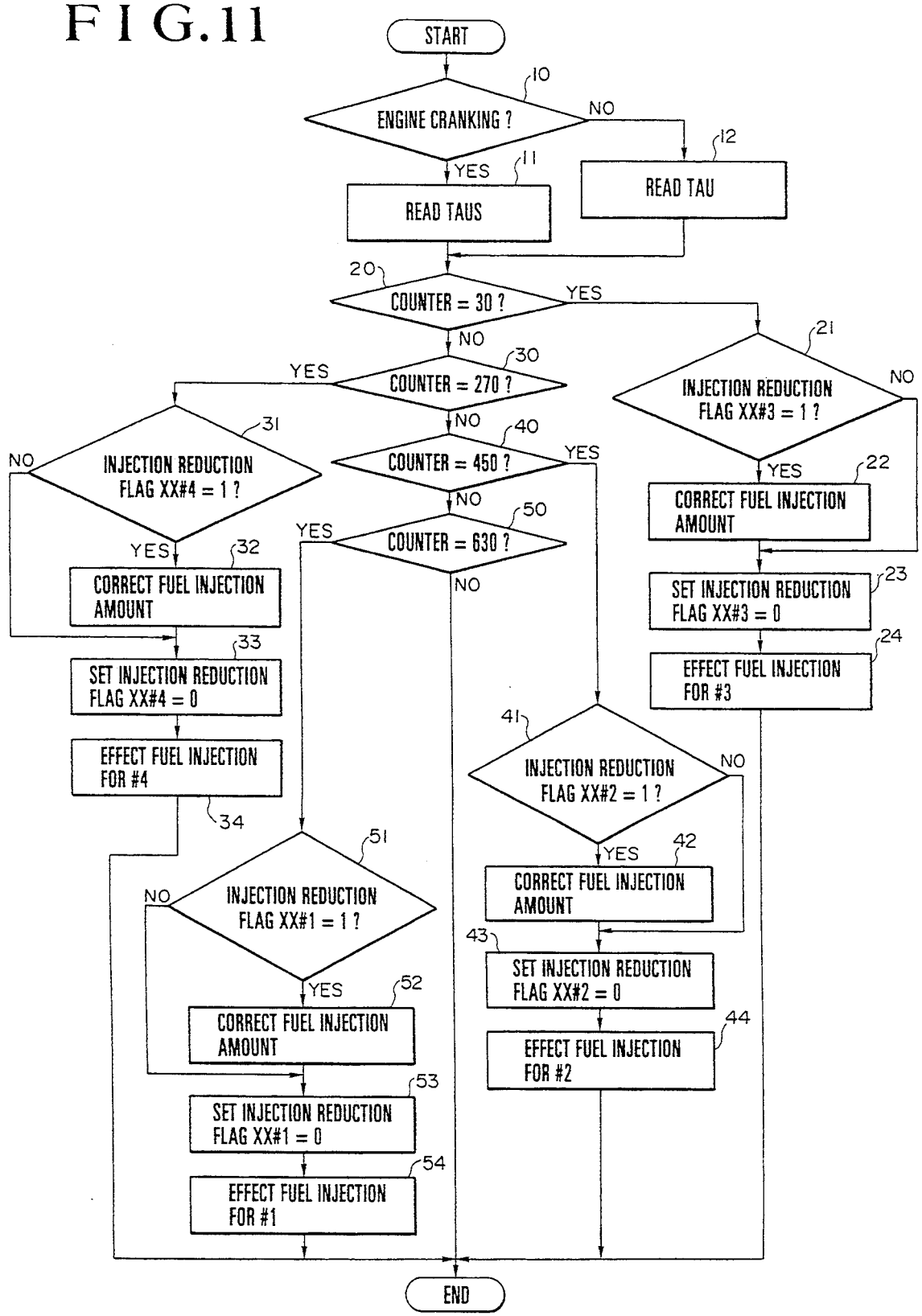
FIG. 11 is a flowchart showing a process of synchronous injection in the preferred embodiment.

Next, discussion will be given for fuel injection in synchronous injection with reference to a flowchart of FIG. 11.

The shown flowchart shows a process, in which a process when the fuel injection amount reduction flag XX#i is set through the asynchronous injection, is added for the synchronous injection upon engine cranking state or in the normal operating state (for example, having engine speeds higher than a predetermined speed). This process is performed by a crank angle dependent interruption at every 30° CA.

Figure 12:
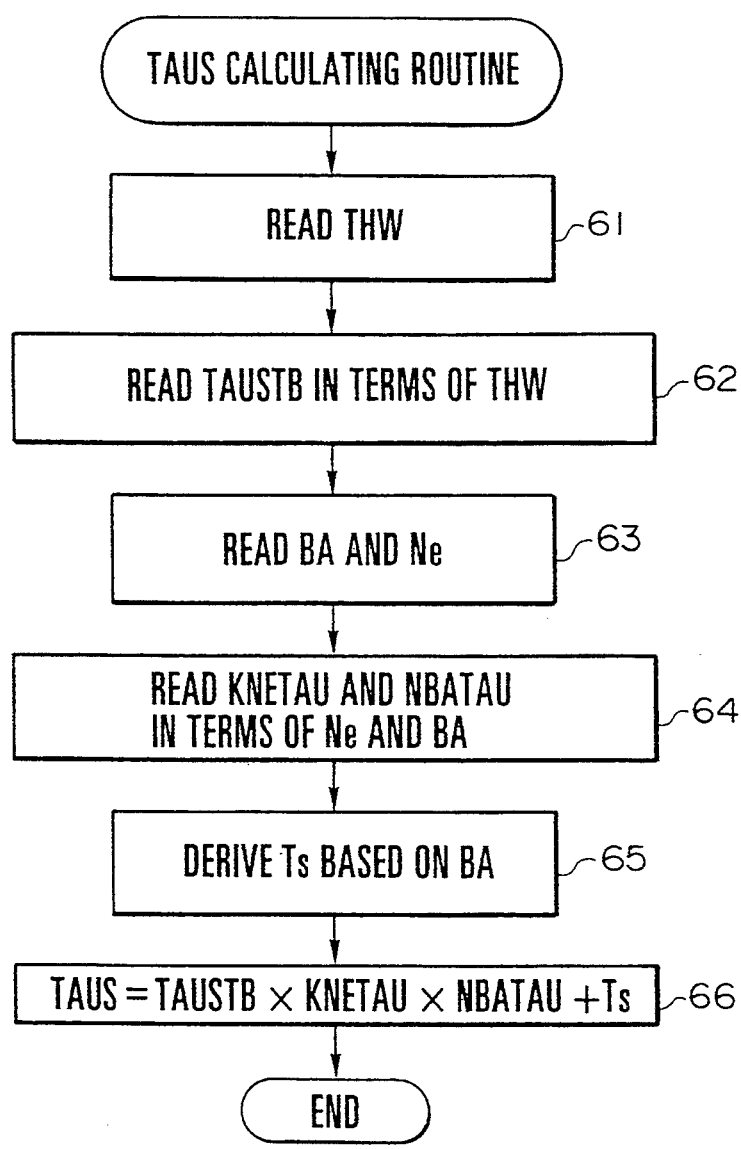
FIG. 12 is a flowchart showing a process for deriving a fuel injection amount in synchronous injection upon starting-up of the internal combustion engine in an example where the present invention is applied for asynchronous injection during engine cranking.
Figure 13:
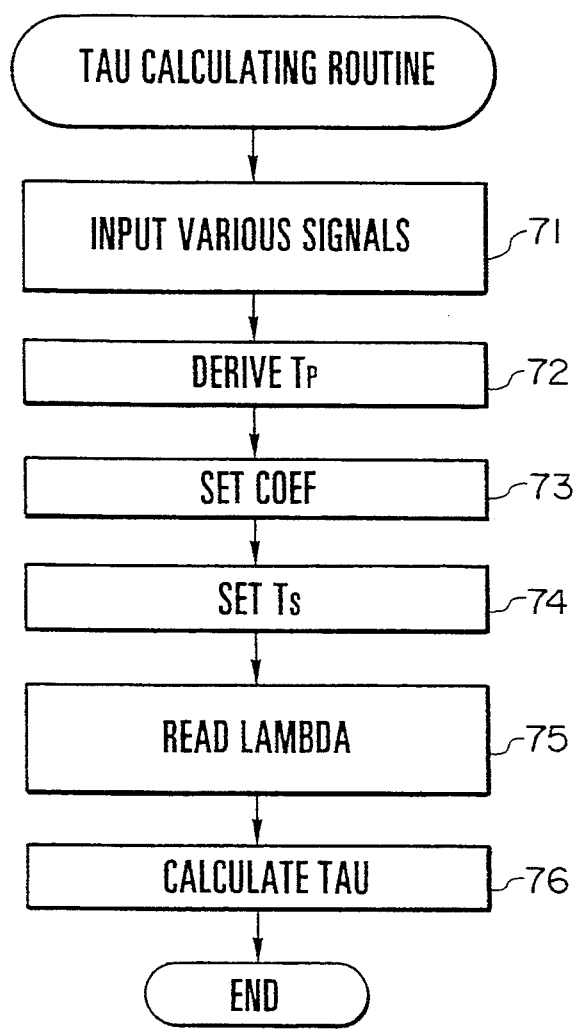
FIG. 13 is a flowchart showing a process for deriving a fuel injection amount in synchronous injection under steady state in an example where the present invention is applied for asynchronous injection upon acceleration.

At a step 10, check is performed whether the engine is in cranking state or not. This is because the method of calculation of the fuel injection amount is different between the engine cranking state and in the normal operating state. When the engine is in cranking state, the process is advanced to a step 11 to read out a fuel injection amount TAUS for engine cranking state. TAUS is calculated through the main routine. The routine for deriving TAUS is shown in FIG. 12 and will be discussed later. If the engine is not in cranking state, the process is advanced to a step 12 to read out a fuel injection amount TAU for normal operating state. TAU is derived through the main routine. The process for deriving TAU is shown in FIG. 13 and will be discussed later. Once the fuel injection amount is derived through the foregoing steps, the process is advanced to a step 20. At the step 20, when the counter value of the crank angle counter 6a in the ECU 6 as set forth above becomes 30, namely when the crank angular position is 30° CA, the process is advanced to a step 21. At the step 21, check is made whether the fuel injection amount reduction flag XX#3 is "1" or not. If XX#3=1, the fuel injection amount is corrected by subtracting the reduction amount from the fuel injection amount at a step 22. Then, at a step 23, the fuel injection amount reduction flag XX#3 is reset to "0". Subsequently, fuel injection for the #3 cylinder takes place at a step 24 and shown process goes END.

When the counter value of the crank angle counter 6a is not 30 as checked at the step 20, the process is advanced to a step 30. At the step 30, the foregoing process is performed. Namely, when the counter value of the crank angle counter 6a is 270, the process is advanced to a step 31. At the step 31, check is made whether the fuel injection amount reduction flag XX#4 is "1" or not. If XX#4=1, the fuel injection amount is corrected by subtracting the reduction amount from the fuel injection amount at a step 32. Then, at a step 33, the fuel injection amount reduction flag XX#4 is reset to "0". Subsequently, fuel injection for the #3 cylinder takes place at a step 34 and shown process goes END. At a step 40, check is made whether the counter value of the crank angle counter 6a is 450° CA or not. when the counter value is 450, substantially the same process to the foregoing steps 21-24 is performed through steps 41–44. At a step 50, check is made whether the counter value of the crank angle counter 6a is 630° CA or not. When the counter value is 630, substantially the same process to the foregoing steps 21–24 is performed through steps 51–54.

Next, a method of calculation of the fuel injection amount in the synchronous injection at the engine cranking state will be discussed according to the fuel injection amount routine under synchronous injection during engine cranking.

At first, the engine coolant temperature THW is read at a step 61. Then, at the engine cranking state, a basic fuel injection amount TAUSTB for synchronous injection is read out from a map stored in the ROM 6c of the ECU 6 in terms of the engine coolant temperature THW, at a step 62. At a step 63, the battery voltage BA and the engine speed $N_e$ are read. On the basis of the engine speed $N_e$, a correction coefficient KNETAU is read from a map stored in the ROM 6c of the ECU 6 in terms of the engine speed $N_e$, at a step 64. At the same time, at the step 64, a correction value NBATAU is read from a map stored in the ROM 6c of the ECU 6 in terms of the battery voltage BA. Also, at a step 65, a non-effective injection period Ts depending upon the battery voltage BA is derived. Then, at a step 66, the fuel injection amount TAUS for synchronous injection upon engine cranking is derived though the following equation:

$$TAUS = TAUSTB \times KNETAU \times NBATAU + Ts \text{ (ms)}$$

The ECU 6 operates the injector 5 to perform fuel injection for the fuel injection amount derived through the foregoing equation in the synchronous injection upon engine cranking.

Next, a method for deriving the fuel injection amount for the synchronous injection to be performed under normal operating condition will be discussed with reference to a flowchart of FIG. 13.

In FIG. 13, at a step 71, various signals necessary for determining the fuel injection amount for the synchronous injection under normal operating state are read out. At a step 72, an effective fuel injection period $T_p$ is derived. $T_p$ can be derived from $K \times Q/N_e$. Here, Q is an intake air flow rate and K is a constant. At a step 73, a correction coefficient COEF determined based on the engine coolant temperature THW, the throttle valve open angle TA, the intake air temperature THA and so forth. Subsequently, at a step 74, the non-effective injection period Ts depending upon the battery voltage BA is set. Then, at a step 75, a feedback coefficient LAMBDA derived on the basis of a signal from the $O_2$ sensor is read out. At a step 76, the fuel injection amount TAU for the synchronous injection is derived through the following equation:

$$TAU = T_p \times COEF \times LAMBDA + Ts$$

Through the process set forth above, the fuel injection amount for the synchronous injection under normal operating state can be derived.

Next, an example where the present invention is applied for engine cranking will be discussed with reference to a timing chart of FIG. 14.

Figure 14:
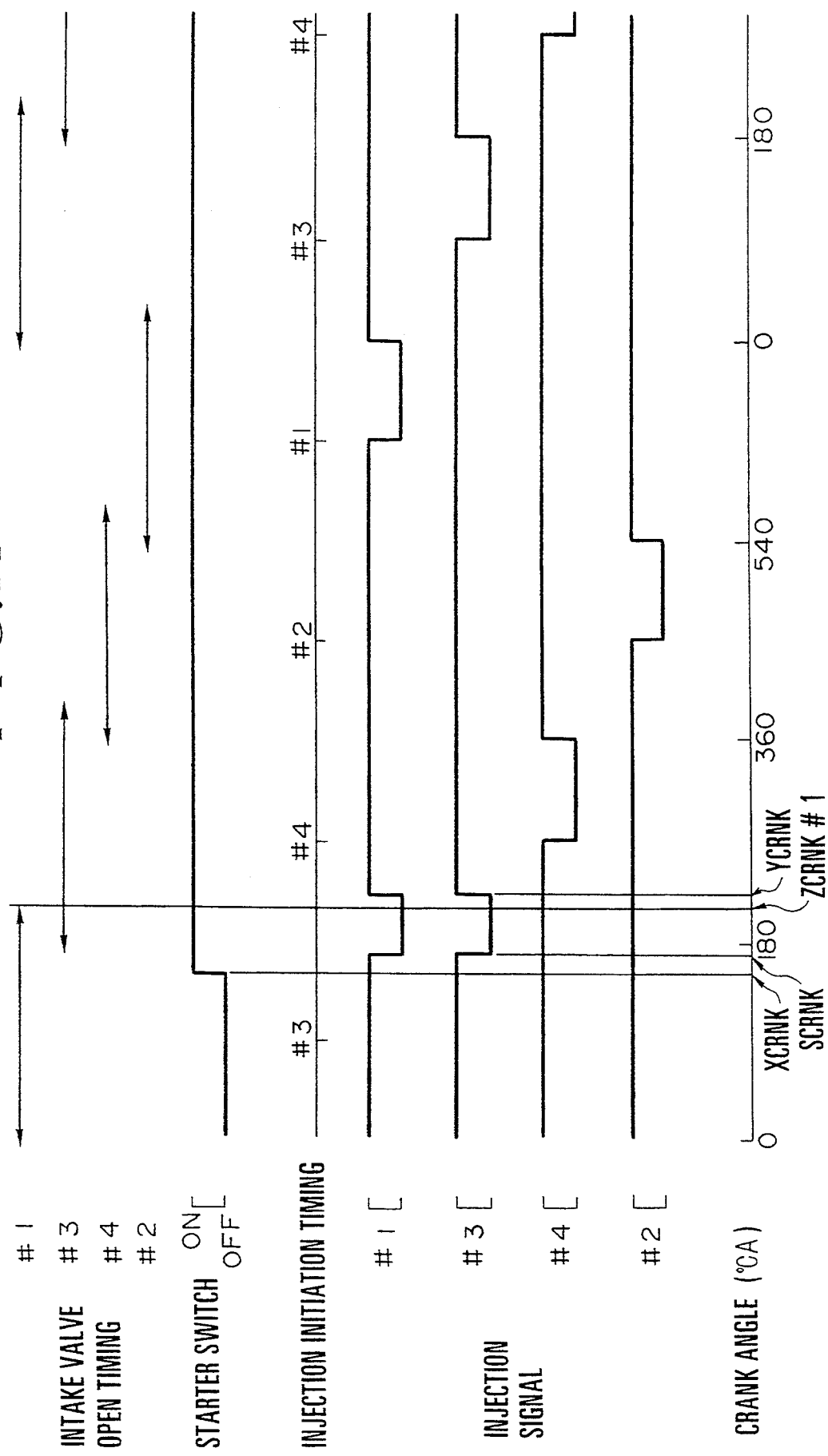
FIG. 14 is a timing chart concerning fuel injection upon starting-up of the internal combustion engine in an example where the present invention is applied for asynchronous injection upon starting-up of the internal combustion engine.

In FIG. 14, the point where the starter switch is turned on from off is the engine stop (or start) position. The crank angle at this timing is assumed as XCRNK. When the starter is turned on and engine cranking is initiated, the asynchronous injection takes place. In FIG. 14, the asynchronous injection takes place in #1 and #3 cylinders. The crank angle position, at which the asynchronous injection takes place, is assumed as SCRNK. Illustratively, in the shown embodiment, the asynchronous injection is to be taken place after 50 ms from initiation of engine cranking. Therefore, SCRNK is delayed from ZCRNK for the corresponding crank angle advanced during the delay period. YCRNK is the crank angular position where the fuel injection is terminated. Here, as can be appreciated from FIG. 14, ZCRNK#1 as the closure timing of the intake valve of the #1 cylinder is present between SCRNK and YCRNK. This means that the injected fuel is divided by closure of the intake valve 4. However, in practice, there is a time difference between the timing of the fuel injection signal and the timing where the fuel injected from the injector 5 actually passes across the intake valve. Therefore, judgement whether the injected fuel is divided by closure of the intake valve 4 should be made by judgement whether $ZCRNK\#1 - 6N_e/100$ falls between SCRNK and YCRNK. At this time, when judgement is made that the fuel amount to be introduced into the cylinder is 80% or more of the injected fuel amount, fuel injection takes place despite of the fact that the injected fuel will be divided by closure of the intake valve. For the next cycle of fuel injection for the #1 cylinder, the fuel injection takes place with reducing the fuel amount corresponding to the amount of fuel residing in the induction pipe. In the shown example, the independent synchronous fuel injection is initiated from the #4 cylinder.

In FIGS. 6, 7, 8 and 9, the step 200 corresponds to a crank angle detecting means, the steps 603 and 606 correspond to an asynchronous injection crank angle calculating means, the step 607 corresponds to an intake valve closure timing detecting means, the step 905 corresponds an injected fuel division judging means, the step 906 corresponds to a combustion judgement means, the steps 907 and 908 correspond a residual fuel amount calculating means and the step 1100 corresponds to an asynchronous fuel injection means. Also, the process shown in the flowchart of FIG. 11 corresponds to a synchronous fuel injection means.

Figure 15:
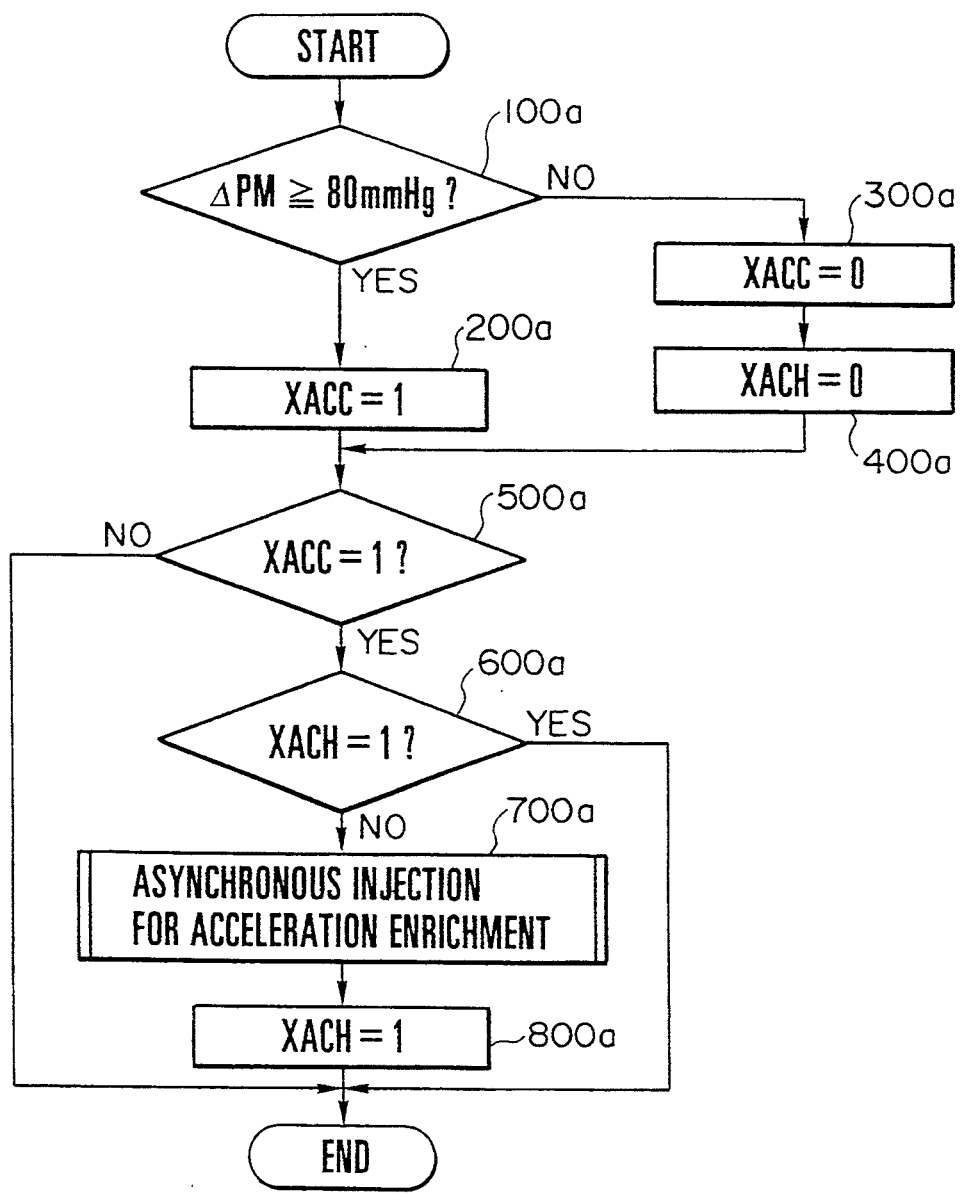
FIG. 15 is a flowchart showing an acceleration detection process in an example where the present invention is applied for asynchronous injection upon acceleration.

Next, an example where the system construction of the present invention illustrated in FIG. 3 is applied for an asynchronous injection during acceleration will be discussed with reference to a flowchart of FIG. 15. The shown process is performed as a time based interruption to be executed at every 4 ms.

The shown routine makes judgement that an acceleration demand is present when the intake pipe pressure is increased in the extend greater than or equal to 80 mmHg.

Initially, at a step 100a, check is performed whether the intake pipe pressure is increased in the extent greater than or equal to 80 mmHg for detection of acceleration demand, through the following equation:

$$\Delta PM = PM - PMOLD \geq 80 \text{ mmHg}$$

wherein PM is a currently measured intake pipe pressure, PMOLD is the intake pipe pressure measured in the preceding cycle, ΔPM is the increased amount of the intake pipe pressure. When the foregoing equation is satisfied, the process is advanced to a step 200a to set an acceleration demand detection flag XACC to "1". Here, the acceleration demand detection flag XACC indicates presence of the acceleration demand by "1" and absence of the acceleration demand by "0". Next, when the acceleration demand detection flag XACC is "1" as checked at a step 500a, the process is advanced to a step 600a. At the step 600a, check is made whether an acceleration asynchronous injection completion flag XACH is "1" or not. The acceleration asynchornous injection completion flag XACH is set to "1" when an acceleration asynchronous injection is completed and to "0" when the acceleration asynchronous injection is not yet completed. Here, if XACH=0, the process is advanced to a step 700a. The step 700a is an acceleration asynchronous injection routine to perform asynchronous injection for acceleration enrichment. The detailed process will be discussed later. When the acceleration asynchronous injection is completed, the acceleration asynchronous injection completion flag XACH is set to "1" at a step 800a. Then, the shown process goes END.

On the other hand, when the foregoing equation is not satisfied as checked at the step 100a, the process is advanced to a step 300a to set XACC to "0". Then, the process is advanced to a step 400a to set XACH to "0". Thereafter, the process is advanced to the step 500a. Since XACC=0 at the step 500a, the shown routine directly goes END.

Through the process set forth above, detection of the acceleration demand can be made and asynchronous injection for acceleration enrichment can be performed only once.

Next, discussion will be given for the asynchornous injection for acceleration enrichment with reference to a flowchart of FIG. 16. The asynchronous injection for acceleration enrichment takes place only once as simultaneous injection for all cylinders. Through the shown routine, a cylinder, in which the injected fuel is divided by closure of the intake valve 4, is detected. If the cylinder, in which the injected fuel is divided, is present, the asynchronous injection does not take place for such cylinder when the rate of the injected fuel to be introduced into the cylinder is less than 80% of the injected fuel amount. On the other hand, when 80% or more of the injected fuel is introduced into the corresponding cylinder, the asynchronous injection takes place. Furthermore, the residual fuel amount in the intake pipe is calculated. Then, in the synchronous injection in the next cycle for the corresponding cylinder, the residual fuel amount is reduced from the normal fuel injection amount.

Figure 17:
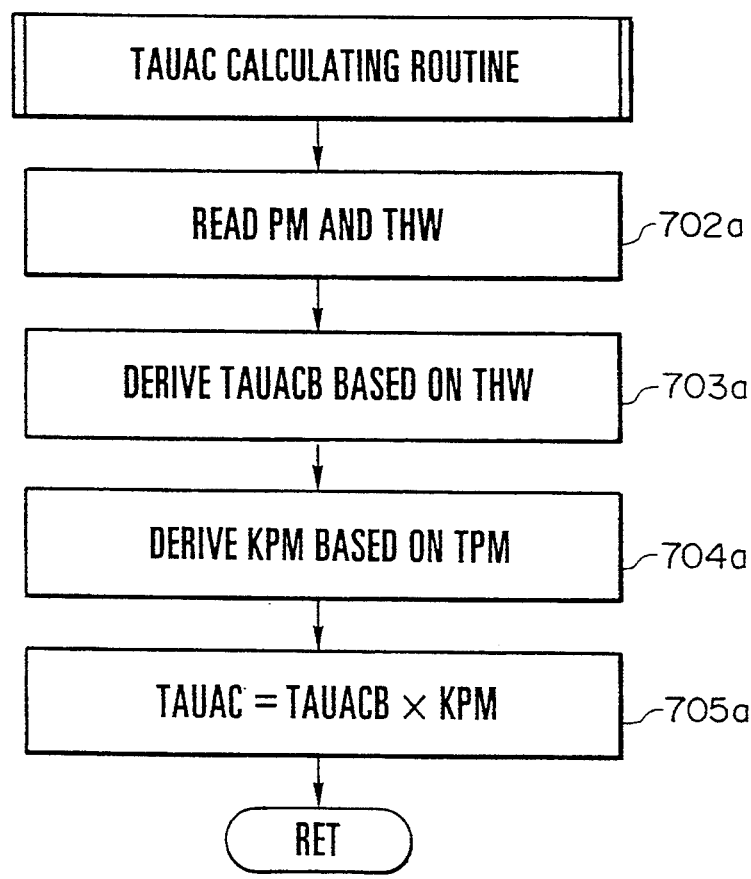
FIG. 17 is a flowchart showing a process for deriving an asynchronous fuel injection amount in an example where the present invention is applied for asynchronous injection upon acceleration.

At first, at a step 701a, an asynchronous fuel injection amount TAUA in acceleration is calculated through the process shown in a flowchart of FIG. 17. The process shown in FIG. 17 will be discussed later. Once calculation of TAUA is completed, the process is advanced to a step 710a. At the step 710a, the crank angle (SCRNK) at the asynchronous injection initiation timing is read out. It is calculated and determined previously by another routine according to a known method for the asynchronous injection. Then, at a step 711a, judgement is made whether the derived SCRNK is greater than or equal to 0° CA and less than 30° CA, or not. When SCRNK falls within the above-mentioned angular range, ZCRNK#2 among the intake valve closure timing ZCRNK#i of each cylinder stored in the ROM 6c of the ECU 6, is set to 30° CA at a step 712a. Then, the process is advanced to a step 713a. At the step 713a, the crank angle (YCRNK) at the fuel injection termination timing in asynchronous injection is calculated on the basis of SCRNK derived at the step 710a and the engine speed $N_e$. In practice, the timing is derived through YCRNK=SCRNK+$6N_e$×TAUAC/1000. At a step 714a, the intake valve closure timing of each cylinder stored in the ROM 6c of the ECU 6 is read out. Next, at a step 715a, the cylinder number i is set to 1. Then, the process is advanced to a step 716a. At the step 716a, judgement is made whether the injected fuel will be divided or not by judging whether the value (ZCRNK#i−$6N_e$/100), in which the crank angle advanced during the fuel transferring period is subtracted from the intake valve closure timing falls between SCRNK and YCRNK. Namely, check is performed whether SCRNK≦ZCRNK−$6N_e$/100≦YCRNK. Substraction of $6N_e$/100 from ZCRNK is performed for correction of an error as discussed above. When the foregoing equation is satisfied, the process is advanced to a step 717a. At the step 717a, check is performed whether the following equation is satisfied:

$$\frac{(ZCRNK\#i - 6N_e/100) - SCRNK}{YCRNK - SCRNK} \geqq 0.8$$

If the foregoing equation is satisfied, the process is advanced to a step 718a. At the step 718a, YZ-#i=YCRNK−ZCRNK#i is calculated. Then, at a step 719, a fuel reduction amount TAUX=YZ-#i·1000/$6N_e$ of the injected fuel in the next cycle is calculated. Next, at a step 702a, the fuel injection amount reduction flag XX#i is set to "1". Here, the fuel injection amount reduction flag XX#i is a flag to reduce the fuel injection amount for the next cycle of the corresponding cylinder in the extent of TAUX when it is set to "1" and to perform fuel injection with the normal fuel injection amount when it is set to "0". Next, at a step 721a, an asynchronous injection identification flag HD#i is set to "1". At a step 722a, for the cylinders other than #i cylinder, the asynchornous injection identification flag is set to "1". Then, at a step 727a, the asynchronous injection takes place for all cylinders, for which the asynchornous injection identification flags are set to "1". Subsequently, the shown process goes END. When the foregoing equation is not satisfied as checked at the step 717a, the process is advanced to the step 722a after setting the asynchornous injection identification flag to "0" at a step 726a.

On the other hand, when judgement is made that the injected fuel is not divided at the step 716a, the process is directly advanced to the step 723a to advance the cylinder number by one. Then, at a step 724a, check is made whether the cylinder number i is 4, namely whether the cylinder number corresponds to the number of cylinders. If the cylinder number i is 4, the process is advanced to a step 725a to set the asynchronous injection identification flag HD#i for each cylinder to "1". Thereafter, the process is advanced to the step 727a. At the step 727a, asynchronous injection is performed for the cylinders, for which the asynchronous injection identification flags are set to "1". Then, the shown routine goes END. If the cylinder number i is not 4 as checked at the step 424a, the process returns to the step 716a.

Through the process set forth above, when the asynchronous injection is performed simultaneously for all cylinders for acceleration enrichment, the cylinder, in which the injected fuel is divided by closure of the intake valve is detected. Furthermore, when the cylinder, in which the injected fuel is divided is detected, the division rate is calculated. As a result of calculation, when the fuel amount to be introduced into the cylinder is less than 80% of the overall amount of the injected fuel, the fuel injection for such cylinder is not performed. On the other hand, when the fuel amount to be introduced into the cylinder is greater than or equal to 80% of the injected fuel, the fuel injection is performed. In such case, the residual fuel amount in the intake pipe is calculated to reduce the fuel injection amount for the next cycle.

Figure 16:
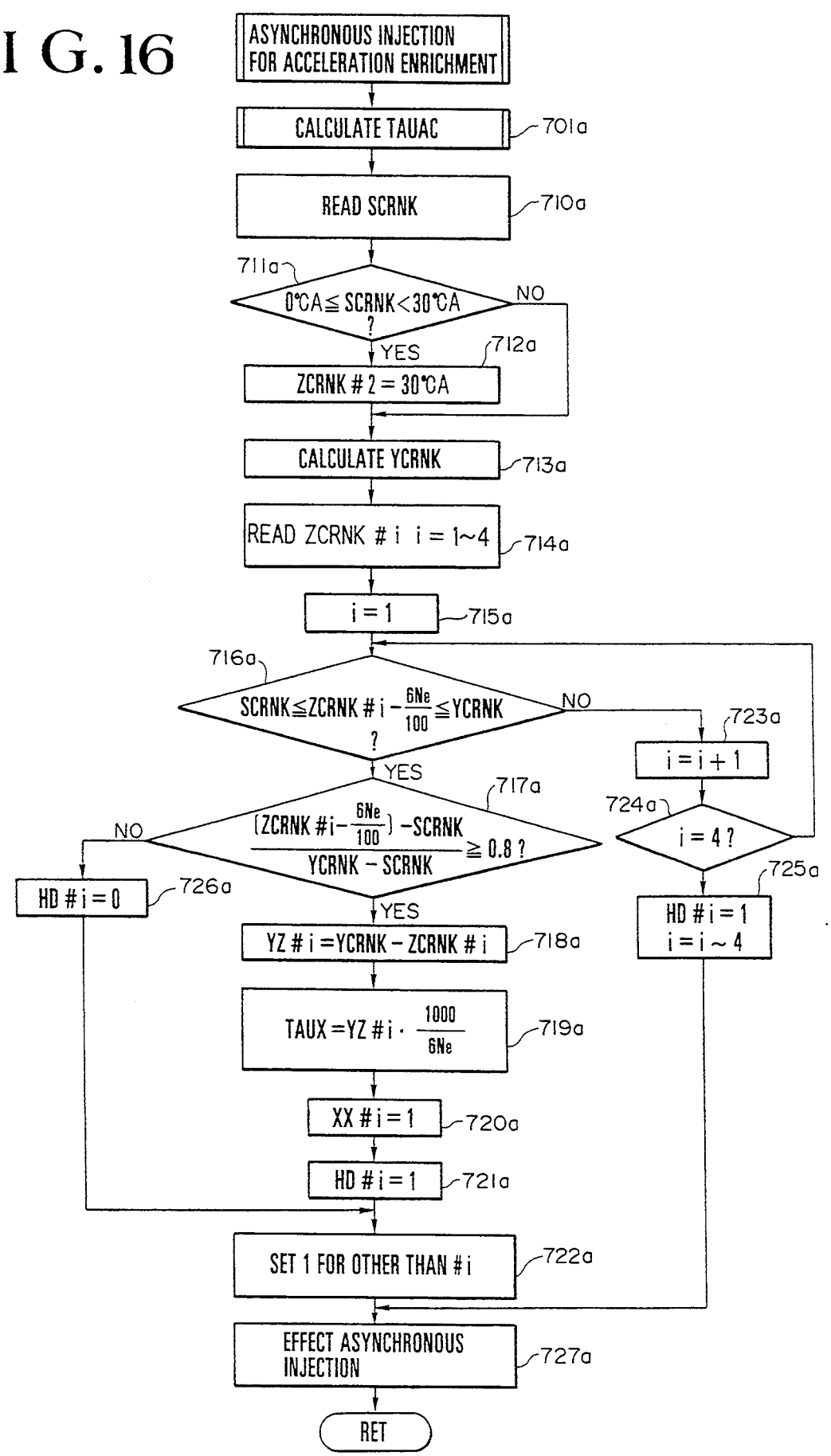
FIG. 16 is a flowchart concerning asynchronous injection in an example where the present invention is applied for asynchronous injection upon acceleration.

In FIG. 16, the steps 710a and 713a correspond to an asynchronous injection crank angle deriving means, the step 714 corresponds to an intake valve closure timing detecting means, the step 716a corresponds to a injected fuel division detecting means, the step 717a corresponds to the combustion judging means, the steps 718a and 719a correspond to a residual fuel amount calculating means, the step 720sa corresponds to a second fuel injection control means, the step 726 corresponds to a first fuel injection control means. On the other hand, the crank angle sensor 10 and the crank angle counter 6a shown in FIG. 3 correspond to a crank angle detecting means and steps 24, 34, 44 and 54 of FIG. 11 correspond to a synchronous injection means.

A method for calculating the fuel injection amount TAUA for the asynchronous injection for acceleration enrichment will be discussed with reference to FIG. 17.

The ECU 6 reads the intake air pressure PM and the engine coolant temperature THW at a step 702a. Then, ECU 6 derives a basic fuel injection amount TAUACB determined based on the engine coolant temperature THW by reading a map stored in the ROM 6c of the ECU 6, at a step 703a. Then, at a step 704a, a correction coefficient KPM is determined depending upon the intake pipe pressure by reading a map stored in the ROM 6c of the ECU 6. Then, the fuel injection amount to be injected in the asynchronous injection for acceleration enrichment is calculated through the following equation, at a step 705a.

$$TAUAC = TAUACB \times KPM$$

Through the process set forth above, the fuel injection amount for asynchornous injection can be determined.

It should be noted that although the shown embodiment employs means for storing the crank angle at termination of operation of the engine and for reading the stored crank angle upon engine cranking as the crank angle detecting means, it is possible to employ means which can detect the crank angle upon cranking of the engine as disclosed in Japanese Unexamined Patent Publication No. 53-149356. The disclosed means is a kind of oscillation circuit comprising a rotor having conductivity on the outer circumferential edge and a coil arranged in opposition to the outer circumferential edge of the rotor, which oscillation circuit generate a voltage corresponding the crank angle by variation of the relative distance between the rotor and the coil depending upon the crank angle position.

Also, although the shown embodiment compensate the time difference due to fuel transfer period by adjusting the closure timing of the intake valve upon making judgement whether the injected fuel will be divided by closure of the intake valve, it is possible to make adjustment by adjusting the fuel injection initiation timing and the fuel injection termination timing with maintaining the intake valve closure timing unadjusted. Namely, in the shown embodiment, $6N_e/100$ is subtracted from ZCRNK#i, the same result may be obtained by adding $6N_e/100$ to SCRNK and YCRNK.

The present invention may be applicable to only one of asynchronous injection for cranking or acceleration enrichment, or to both.

What is claimed is:

1. A fuel injection control system for an internal combustion engine comprising:
   crank angle detecting means for detecting a crank angle;
   synchronous-injection means for performing synchronous injection of a fuel into an intake manifold for each cylinder in synchronism with the crank angle detected by said crank angle detecting means;
   intake valve closure timing detecting means for detecting a crank angle corresponding to closure of an intake valve of each cylinder of the engine, in advance;
   asynchronous injection means for performing asynchronous injection of fuel into the intake manifold of each cylinder upon at least one of engine starting state and acceleration state;
   asynchronous injection crank angle computing means for determining crank angles at initiation of an asynchronous injection of fuel and termination of the asynchronous injection before initiation of said asynchronous injection to be performed by said asynchronous injection means;
   injected fuel division checking means for checking whether fuel amount of the asynchronous injection performed by said asynchronous injection means is divided or not by the closure of the intake valve caused at the crank angle detected by said intake valve closure timing detecting means in advance and said crank angles determined by said asynchronous injection crank angle computing means; and
   first fuel injection control means for inhibiting fuel injection when said injected fuel division checking means detects a division of the fuel amount.

2. A fuel injection control system according to claim 1, further comprising combustion judging means for judging whether combustion is possible with the divided fuel amount when a division of the injected fuel is detected by said injected fuel division checking means, and releasing said first fuel injection control means from inhibiting of fuel injection in order to allow fuel injection when judging combustion as possible to take place with the divided fraction of the injected fuel.

3. A fuel injection control system according to claim 2, further comprising:
   residual fuel amount computing means computing a residual amount of fuel possibly residing in the intake manifold after possible combustion of fuel injection is performed; and
   second fuel injection control means for controlling said synchronous injection means to perform a next cycle synchronous injection of fuel amount reduced by a corresponding amount to the computed residual fuel amount.

4. A fuel injection control system according to claim 1, including engine state detection means for detecting engine starting state/engine normal operating state; and means, responsive to said engine state detection means, for computing an amount of fuel TAUS for synchronous injection in a detected engine starting state/an amount of fuel for synchronous injection in a detected engine normal operating state by means of detecting engine control parameters of cooling water temperature, battery voltage and engine speed Ne.

5. A fuel injection control system according to claim 4, wherein said asynchronous injection means includes memory means for storing a crank angle XCRNK of each cylinder; and means for detecting which of predetermined ranges of crank angles the stored crank angle is calculated in and designating a cylinder to have an asynchronous injection performed with the detection of one of the crank angle ranges.

6. A fuel injection control system according to claim 5, wherein said asynchronous injection crank angle computing means includes means for determining a timing of crank angle SCRNK for the initiation of an asynchronous injection by computing $$SCRNK = XCRNK + \frac{3Ne}{10}$$

and determining a timing of crank angle YCRNK for the termination of the asynchronous injection by computing $$YCRNK = SCRNK + \left( \frac{6Ne \times TAUS}{1000} \right).$$

7. A fuel injection control system according to claim 6, wherein said injected fuel division checking means includes means for prestoring a crank angle position ZCRNK#i for closure of each cylinder; means for adjusting timing of the intake valve closure of a predetermined cylinder in response to the computed SCRNK.

8. A fuel injection control system according to claim 7, wherein said combustion judging means is adapted to judge the combustion as possible by confirming a relation $$\frac{\left( ZCRNK\#i - \frac{6Ne}{100} \right) - SCRNK}{YCRNK - SCRNK} \geq 0.8$$

with each cylinder #i.

9. A fuel injection control system according to claim 8, wherein said second fuel injection control means is adapted to reduce a fuel amount TAUS computed for the next cycle sync injection by an amount of $$\frac{1000}{6Ne} \times \left[ YCRNK - \left( ZCRNK\#i - \frac{6Ne}{100} \right) \right].$$

10. A fuel injection control system according to claim 8, wherein said second fuel injection control means includes means for reducing a fuel amount TAUS/TAU computed for synchronous injection by a corresponding amount to the computed residual amount of fuel in response to each of predetermined crank angles (30°, 270°, 450°, 630°).

11. A fuel injection control system according to claim 3, wherein said asynchronous injection crank angle computing means includes means for computing amount of fuel TAUAC for asynchronous injection with detection of intake air pressure and cooling water temperature under engine accelerating condition; and means for detecting a crank angle SCRNK corresponding to a predetermined increment in intake air pressure in order for the initiation of asynchronous injection and determining a crank angle YCRNK by computing a relation YCRNK=

$$SCRNK + \frac{6Ne \times TAUAC}{1000}.$$

12. A fuel injection control system according to claim 11, wherein said injected fuel division checking means is adapted to check if $$SCRNK \leq (ZCRNK\#i - 6Ne/100) \leq YCRNK,$$

where ZCRNK#i indicates a predetermined crank angle corresponding to the closure of an optional cylinder #i intake valve.

13. A fuel injection control system according to claim 12, wherein said first fuel injection control means includes means for checking if $$\frac{\left( ZCRNK\#i - \frac{6Ne}{100} \right) - SCRNK}{YCRNK - SCRNK} \geq 0.8$$

in order to judge whether combustion is possible with the divided fuel amount; and said second fuel injection control means includes means for determining the residual amount of fuel YZ#i by computing a relation YZ#i=YCRNK−ZCRNK#i.

* * * * *